United States Patent
Koda et al.

(10) Patent No.: US 12,299,762 B2
(45) Date of Patent: May 13, 2025

(54) SERVER DEVICE, INFORMATION PROCESSING METHOD, PROGRAM, AND STORAGE MEDIUM

(71) Applicant: PIONEER CORPORATION, Tokyo (JP)

(72) Inventors: Takeshi Koda, Kawagoe (JP); Keiji Katata, Kawagoe (JP)

(73) Assignee: PIONEER CORPORATION, Tokyo (JP)

( * ) Notice: Subject to any disclaimer, the term of this patent is extended or adjusted under 35 U.S.C. 154(b) by 0 days.

(21) Appl. No.: 18/488,737

(22) Filed: Oct. 17, 2023

(65) Prior Publication Data

US 2024/0095866 A1 Mar. 21, 2024

Related U.S. Application Data

(63) Continuation of application No. 17/042,857, filed as application No. PCT/JP2019/010237 on Mar. 13, 2019, now abandoned.

(30) Foreign Application Priority Data

Mar. 28, 2018 (JP) ................................. 2018-063324

(51) Int. Cl.
*G06Q 50/40* (2024.01)
*G06F 16/16* (2019.01)
(Continued)

(52) U.S. Cl.
CPC ........... *G06Q 50/40* (2024.01); *G06F 16/162* (2019.01); *G06Q 10/10* (2013.01); *G06Q 40/08* (2013.01);
(Continued)

(58) Field of Classification Search
CPC ........ G06Q 50/40; G06Q 40/08; G06Q 10/10; G06F 16/162; G07C 5/008; H04L 67/10; H04L 67/12
See application file for complete search history.

(56) References Cited

U.S. PATENT DOCUMENTS 8,438,194 B2 5/2013 Uno
10,156,848 B1 * 12/2018 Konrardy ............. G05D 1/0293
(Continued)

FOREIGN PATENT DOCUMENTS

JP 2010/086080 A 4/2010
JP 2016057946 A 4/2016
(Continued)

OTHER PUBLICATIONS

European Search Report issued on the corresponding European Patent Appln. No. 23187304.3 on Oct. 23, 2023.
(Continued)

*Primary Examiner* — Huawen A Peng
(74) *Attorney, Agent, or Firm* — PROCOPIO, CORY, HARGREAVES & SAVITCH LLP

(57) ABSTRACT

A terminal device used by a user of a vehicle includes a first input unit configured to receive a first user ID inputted by the user, a first transmission unit configured to transmit the first user ID to a second server device operated by a service providing company, a receiving unit configured to receive service information from the second server device, the service information including provision information, the provision information indicating information to be provided from a first server device to the second server device from among information transmitted from a terminal device of the vehicle to the first server device, a storage unit configured to store the received service information, a second input unit configured to receive a use start instruction of the vehicle inputted by the user, and a second transmission unit config- (Continued)

ured to transmit the service information to the terminal device of the vehicle.

9 Claims, 14 Drawing Sheets

(51) Int. Cl.
    *G06Q 10/10*      (2023.01)
    *G06Q 40/08*      (2012.01)
    *G07C 5/00*       (2006.01)
    *H04L 67/10*      (2022.01)
    *H04L 67/12*      (2022.01)
(52) U.S. Cl.
    CPC .............. *G07C 5/008* (2013.01); *H04L 67/10* (2013.01); *H04L 67/12* (2013.01)

(56) References Cited

U.S. PATENT DOCUMENTS

| | | | |
|---|---|---|---|
| 2003/0163233 A1* | 8/2003 | Song | G06Q 10/06 701/31.4 |
| 2014/0380442 A1 | 12/2014 | Addepalli et al. | |
| 2016/0189304 A1* | 6/2016 | Todasco | G06Q 40/08 705/4 |
| 2016/0364921 A1* | 12/2016 | Iyoda | H04L 67/52 |
| 2017/0187707 A1 | 6/2017 | Miu et al. | |
| 2017/0272913 A1 | 9/2017 | Yamashiro et al. | |
| 2018/0121862 A1* | 5/2018 | Garry | G06Q 10/20 |
| 2019/0042996 A1* | 2/2019 | Watanabe | G07C 5/008 |
| 2019/0188926 A1* | 6/2019 | Umigai | G07C 5/02 |
| 2019/0202402 A1 | 7/2019 | Sakurada et al. | |
| 2019/0205818 A1 | 7/2019 | Sakurada et al. | |
| 2021/0021587 A1 | 1/2021 | Miu et al. | |
| 2022/0217134 A1 | 7/2022 | Miu et al. | |

FOREIGN PATENT DOCUMENTS

| | | |
|---|---|---|
| JP | 2017151942 A | 8/2017 |
| KR | 2014-0039097 A | 4/2014 |
| WO | 2017/117390 A1 | 7/2017 |

OTHER PUBLICATIONS

International Search Report for related Int. App. No. PCT/JP2019/010237 dated May 28, 2019; 2 pages.
European Patent Office, Extended European Search Report, Application No. 19776455.8, dated Oct. 28, 2021, in 8 pages.

* cited by examiner (B)

FIG. 5

SERVICE INFORMATION

| SHARED VEHICLE USER ID | VEHICLE CLOUD | SERVICE CLOUD USER ID | PROVISION INFORMATION | DESTINATION ADDRESS |
|---|---|---|---|---|
| U123456 | CL001 (OPERATED BY COMPANY A) | XXXX1 (INSURANCE COMPANY) | ・SHOOTING INFORMATION FOR N MINUTES BEFORE & AFTER ACCIDENT | xxx.xxx.co.jp |
| | | ZZZZ1 (MAP SERVICE COMPANY) | ・RECOGNIZED OBJECT INFORMATION<br>・TRAVELING ROUTE INFORMATION | zzz.zzz.co.jp |
| | | WWWWW (PARKING LOT SERVICE COMPANY) | ・USER'S DESTINATION | www.www.co.jp |
| | | RRRRR (ROUTE SEARCH SERVICE COMPANY) | ・STARTING POINT/DESTINATION /ON-ROUTE POINT<br>・TRAVELING AREA | rrr.rrr.co.jp |
| | CL002 (OPERATED BY COMPANY B) | XXXX2 (INSURANCE COMPANY) | ・SHOOTING INFORMATION FOR N MINUTES BEFORE & AFTER ACCIDENT | xx2.xx2.co.jp |
| | | ZZZZ2 (MAP SERVICE COMPANY) | ・RECOGNIZED OBJECT INFORMATION<br>・TRAVELING ROUTE INFORMATION | zzzz.zzzz.co.jp |

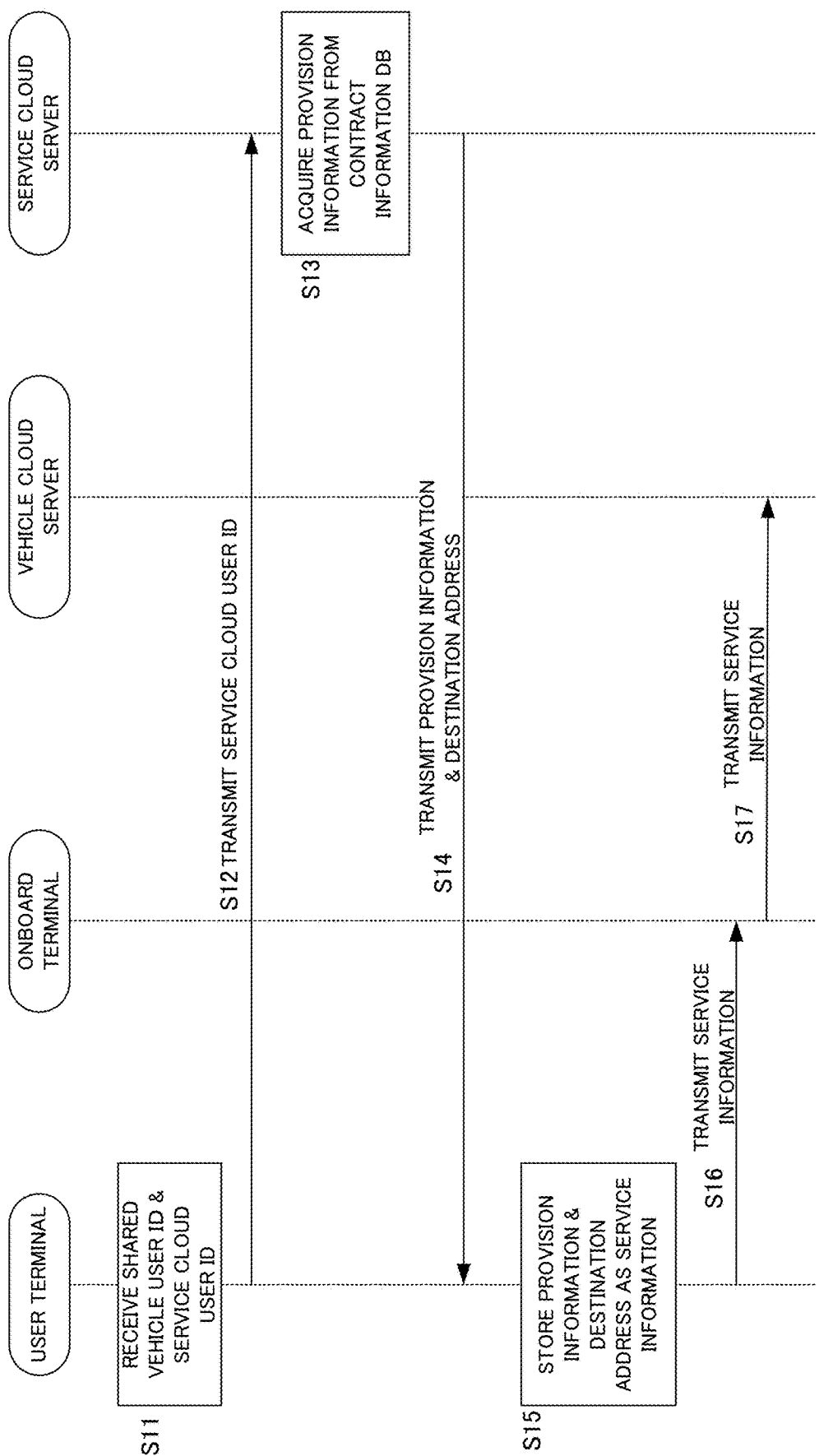

FIG. 7A

SERVICE INFORMATION TRANSMITTED FROM ONBOARD TERMINAL TO VEHICLE CLOUD (CL001)

| SHARED VEHICLE USER ID | SERVICE CLOUD USER ID | PROVISION INFORMATION | DESTINATION ADDRESS |
|---|---|---|---|
| U123456 | XXXX1 (INSURANCE COMPANY) | ·SHOOTING INFORMATION FOR N MINUTES BEFORE & AFTER ACCIDENT | xxx.xxx.co.jp |
| | ZZZZ1 (MAP SERVICE COMPANY) | ·RECOGNIZED OBJECT INFORMATION<br>·TRAVELING ROUTE INFORMATION | zzz.zzz.co.jp |
| | WWWWW (PARKING LOT SERVICE COMPANY) | ·USER'S DESTINATION | www.www.co.jp |
| | RRRRR (ROUTE SEARCH SERVICE COMPANY) | ·STARTING POINT/DESTINATION /ON-ROUTE POINT<br>·TRAVELING AREA | rrr.rrr.co.jp |

FIG. 7B

SERVICE INFORMATION TRANSMITTED FROM ONBOARD TERMINAL TO VEHICLE CLOUD (CL002)

| SHARED VEHICLE USER ID | SERVICE CLOUD USER ID | PROVISION INFORMATION | DESTINATION ADDRESS |
|---|---|---|---|
| U123456 | XXXX2 (INSURANCE COMPANY) | ·SHOOTING INFORMATION FOR N MINUTES BEFORE & AFTER ACCIDENT | xx2.xx2.co.jp |
| | ZZZZ2 (MAP SERVICE COMPANY) | ·RECOGNIZED OBJECT INFORMATION<br>·TRAVELING ROUTE INFORMATION | zzz2.zzz.co.jp |

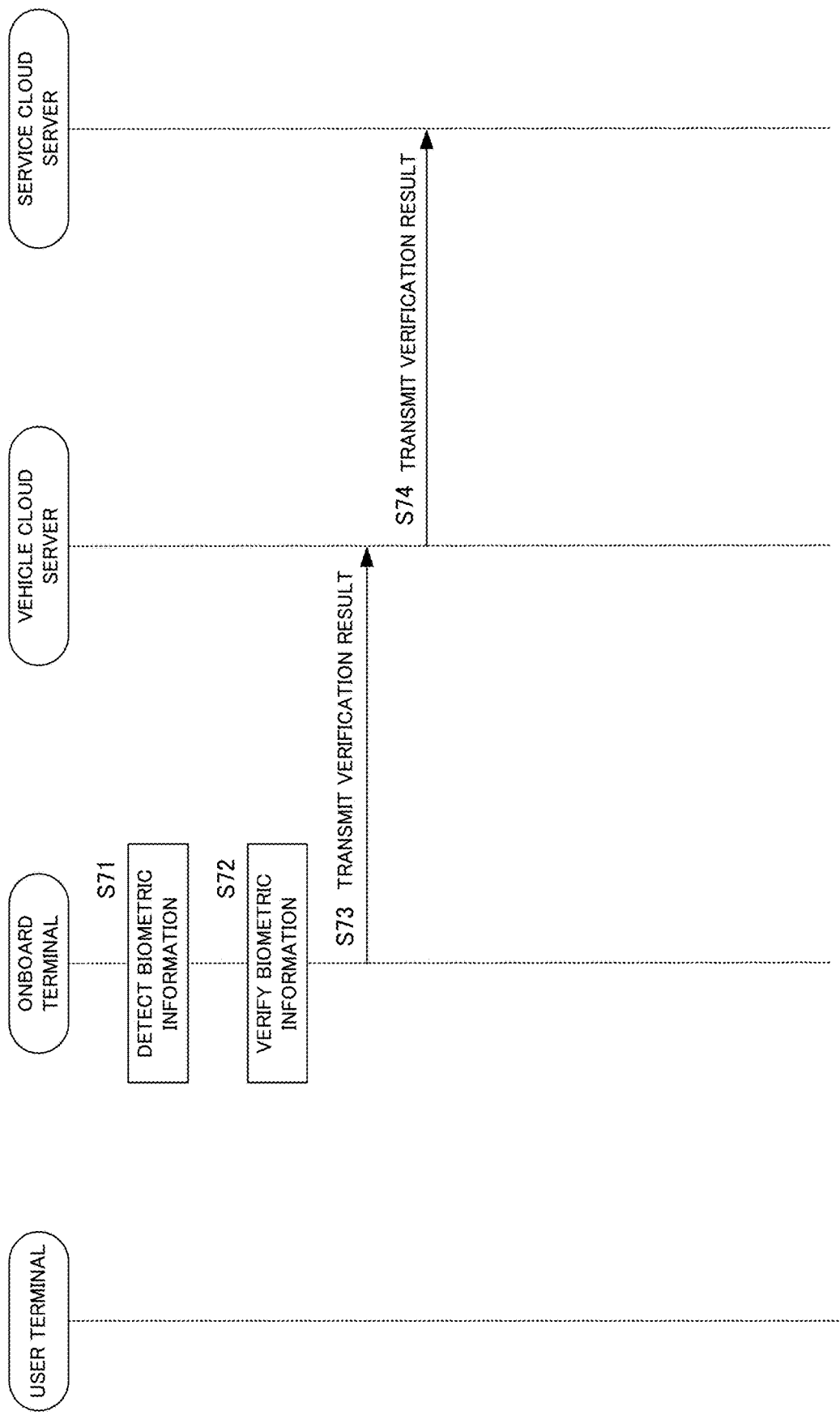

SERVER DEVICE, INFORMATION PROCESSING METHOD, PROGRAM, AND STORAGE MEDIUM

CROSS-REFERENCE TO RELATED APPLICATIONS

This application is continuation application of U.S. patent application Ser. No. 17/042,857 filed on Dec. 11, 2020, which claims priority to PCT/JP2019/010237, filed on Mar. 13, 2019 and Japanese Patent Application No. 2018-063324, filed on Mar. 28, 2018, the entire contents of which are incorporated herein by reference in their entirety.

TECHNICAL FIELD

The present invention relates to techniques for providing various services with respect to autonomous driving vehicles used for car-sharing.

BACKGROUND TECHNIQUE

When autonomous driving vehicles become popular, it is thought that, not only an autonomous driving vehicle is owned as a private car, but car sharing will develop. Techniques relating to car sharing of autonomous driving vehicles are described in Patent reference 1.

PRIOR ART REFERENCES

Patent Reference

Patent Reference 1: Japanese Patent Application Laid-Open under No. 2016-57946.

SUMMARY OF THE INVENTION

Problem to be Solved by the Invention

An autonomous driving vehicle transmits various information such as the position and route in which the vehicle is traveling, information of objects in the vicinity detected by the sensor or else to a server which manages the autonomous driving vehicles. Then, companies providing various services related to autonomous driving vehicles require various information related to the autonomous driving vehicles to provide services. Now, it is considered a case where a user receives services related to an autonomous vehicle, for example, services by an insurance company. In this case, it is desirable that the server that manages the autonomous driving vehicle provides only the information required by the insurance company among the information obtained from the autonomous driving vehicle to the insurance company. Therefore, there is a need for a system in which the servers that manage the autonomous driving vehicles select information obtained from autonomous driving vehicles, and provide the information to the companies that provide the services.

The present invention has been made to solve the problems as described above, and an object thereof is to provide various services for an autonomous driving vehicle for car-sharing.

Means for Solving the Problem

An invention described in claims is a server device which collects information from a vehicle, comprising: a storage unit configured to receive acquired information acquired by the vehicle from an onboard terminal mounted on the vehicle during a use of the vehicle by a user, and stores the acquired information; an information providing unit configured to provide information requested by a service providing company which provides a service related to the vehicle, among the required information, to a server device of the service providing company; a reception unit configured to receive a deletion request of the acquired information; a deletion unit configured to delete the acquired information stored in the storage unit; and a transmission unit configured to transmit a deletion request of the acquired information provided to the service providing company to the server device of the service providing company based on the deletion request.

Another invention described in claims is an information processing method executed by a server device which collects information from a vehicle, comprising: a storage process configured to receive acquired information acquired by the vehicle from an onboard terminal mounted on the vehicle during a use of the vehicle by a user, and stores the acquired information in a storage unit; an information providing process configured to provide information requested by a service providing company which provides a service related to the vehicle, among the required information, to a server device of the service providing company; a reception process configured to receive a deletion request of the acquired information; a deletion process configured to delete the acquired information stored in the storage unit; and a transmission process configured to transmit a deletion request of the acquired information provided to the service providing company to the server device of the service providing company based on the deletion request.

Still another invention described in claims is a program executed by a server device which includes a computer and which collects information from a vehicle, the program causing the computer to function as: a storage unit configured to receive acquired information acquired by the vehicle from an onboard terminal mounted on the vehicle during a use of the vehicle by a user, and stores the acquired information; an information providing unit configured to provide information requested by a service providing company which provides a service related to the vehicle, among the required information, to a server device of the service providing company; a reception unit configured to receive a deletion request of the acquired information; a deletion unit configured to delete the acquired information stored in the storage unit; and a transmission unit configured to transmit a deletion request of the acquired information provided to the service providing company to the server device of the service providing company based on the deletion request.

BRIEF DESCRIPTION OF THE DRAWINGS

FIG. 5 is an example of service information.

FIG. 6 is a flowchart of service information registration processing.

FIGS. 7A and 7B are examples of service information transmitted from the onboard terminal to the vehicle cloud.

FIG. 15 is a flowchart of the authentication processing during the use of the shared vehicle.

DETAILED DESCRIPTION OF THE PREFERRED EMBODIMENTS

Figure 1:
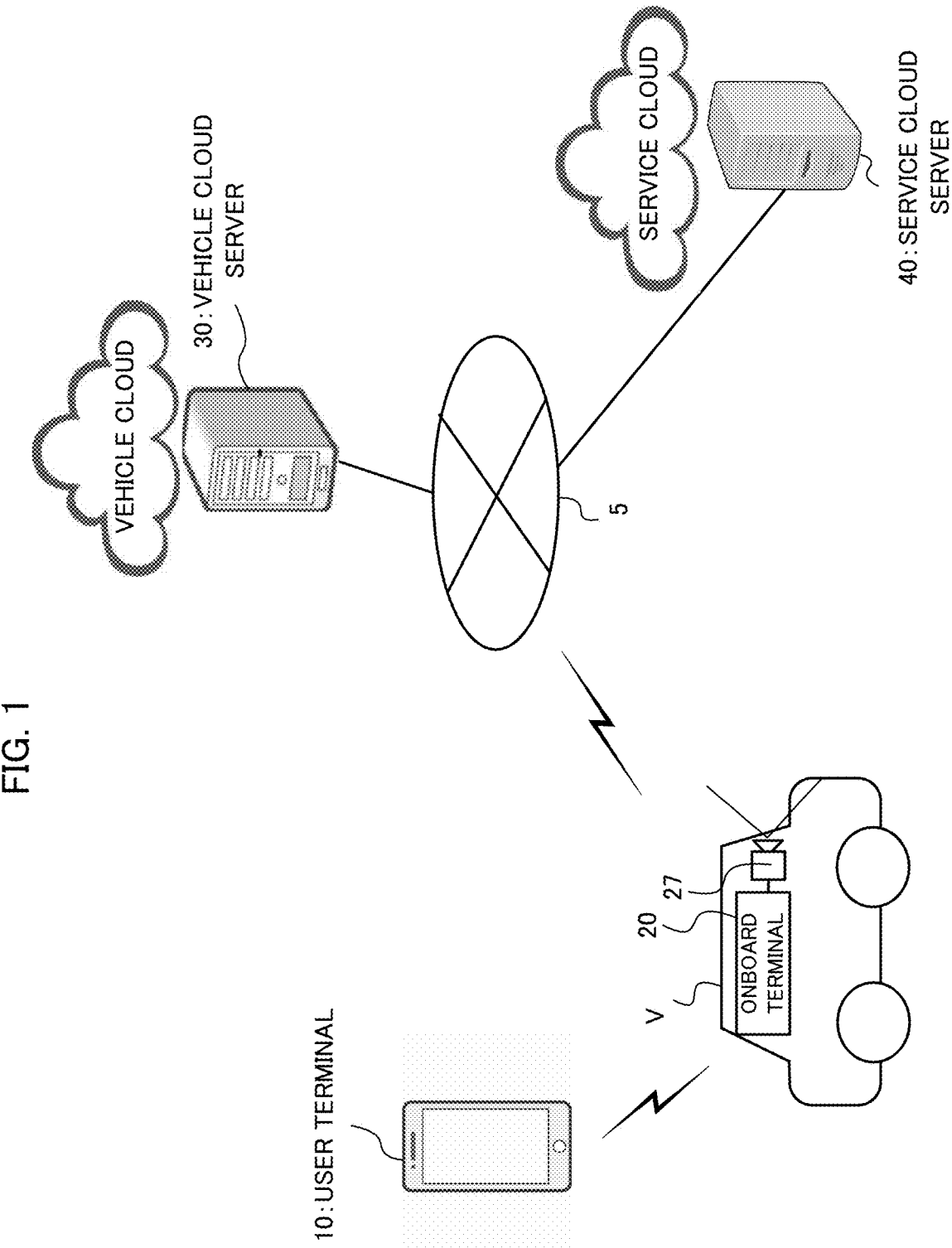
FIG. 1 is a schematic configuration of a car sharing system according to an embodiment.

According to one aspect of the present invention, there is provided a server device which collects information from a vehicle, comprising: a storage unit configured to receive acquired information acquired by the vehicle from an onboard terminal mounted on the vehicle during a use of the vehicle by a user, and stores the acquired information; an information providing unit configured to provide information requested by a service providing company which provides a service related to the vehicle, among the required information, to a server device of the service providing company; a reception unit configured to receive a deletion request of the acquired information; a deletion unit configured to delete the acquired information stored in the storage unit; and a transmission unit configured to transmit a deletion request of the acquired information provided to the service providing company to the server device of the service providing company based on the deletion request.

The above server device receives acquired information acquired by the vehicle from an onboard terminal mounted on the vehicle during a use of the vehicle by a user, and stores the acquired information. Then, the server device provides information requested by a service providing company which provides a service related to the vehicle, among the required information, to a server device of the service providing company. Also, the server device deletes the acquired information stored in the storage unit when it receives the deletion request of the acquired information, and transmits a deletion request of the acquired information provided to the service providing company to the server device of the service providing company based on the deletion request.

In one mode of the above server device, the storage unit stores information requested by the service providing company for each service providing company.

In a preferred example, the reception unit receives the deletion request from the onboard terminal. In another preferred example, the reception unit receives the deletion request from a terminal device of the user.

Another mode of the above server device further comprises a notification unit configured to receive a notification indicating that the acquired information is deleted from the server device of the service providing company, and notifies the onboard terminal that the acquired information is deleted from the server device of the service providing company.

Thus, it is possible to notify the user that the acquired information is deleted from the server device of the service providing company.

In still another mode of the above server device, the notification unit compares an amount of the acquired information provided to the service providing company with the amount of the acquired information deleted by the service providing company to confirm that the acquired information is deleted, and notifies the onboard terminal that the acquired information is deleted from the server device of the service providing company when it is confirmed that the acquired information is deleted.

In still another mode of the above server device, the notification unit notifies the onboard terminal that the acquired information is deleted from the storage unit by the deletion unit. Thus, it is possible to notify the user that the acquired information is deleted from the storage unit of the server device.

According to another aspect of the present invention, there is provided an information processing method executed by a server device which collects information from a vehicle, comprising: a storage process configured to receive acquired information acquired by the vehicle from an onboard terminal mounted on the vehicle during a use of the vehicle by a user, and stores the acquired information in a storage unit; an information providing process configured to provide information requested by a service providing company which provides a service related to the vehicle, among the required information, to a server device of the service providing company; a reception process configured to receive a deletion request of the acquired information; a deletion process configured to delete the acquired information stored in the storage unit; and a transmission process configured to transmit a deletion request of the acquired information provided to the service providing company to the server device of the service providing company based on the deletion request. Thus, the information acquired during the use of the vehicle is deleted in response to the user's deletion request.

According to still another aspect of the present invention, there is provided a program executed by a server device which includes a computer and which collects information from a vehicle, the program causing the computer to function as: a storage unit configured to receive acquired information acquired by the vehicle from an onboard terminal mounted on the vehicle during a use of the vehicle by a user, and stores the acquired information; an information providing unit configured to provide information requested by a service providing company which provides a service related to the vehicle, among the required information, to a server device of the service providing company; a reception unit configured to receive a deletion request of the acquired information; a deletion unit configured to delete the acquired information stored in the storage unit; and a transmission unit configured to transmit a deletion request of the acquired information provided to the service providing company to the server device of the service providing company based on the deletion request. By executing this program by the computer, the above server device may be realized. This program may be handled in a manner stored in a storage medium.

Embodiments

Preferred embodiments of the present invention will be described below with reference to the accompanied drawings.

[Car Sharing System]
(Overall Configuration)

FIG. 1 illustrates a schematic configuration of a car sharing system according to an embodiment. The car sharing system includes a user terminal 10 used by a user, a shared vehicle V, a vehicle cloud server 30, and a service cloud server 40.

The user terminal 10 is a terminal device used by a user using a shared vehicle, and is typically a smart phone of the user or the like. The shared vehicle V is an autonomous driving vehicle provided to users. An onboard terminal 20 is mounted on the shared vehicle V, and the user terminal 10 and the onboard terminal 20 is capable of transmitting and receiving data by wireless communication.

The vehicle cloud server 30 is a server device constituting the vehicle cloud. The vehicle cloud is a cloud operated by an information collection company that manages autonomous driving vehicles provided to users, and collects various types of information from the autonomous driving vehicles. The information collection companies are operated by manufacturers of the autonomous driving vehicles. For example, if there are three companies A, B and C as the automobile manufacturers of the autonomous driving vehicles, an information collection company operated by A, an information collection company operated by B and an information collection company operated by C exist individually, and each information collection company collects various types of information from the autonomous driving vehicles manufactured by the automobile manufacturer that operates the information collection company.

The service cloud server 40 is a server device constituting a service cloud. The service cloud is a cloud operated by a service providing company that provides services related to autonomous driving vehicles. The service providing companies include an insurance company that provides services related to insurance, a map service company that provides services related to maps, a parking lot service company that provides services related to parking lots, and a route search service company that provides services related to route search.

The onboard terminal 20 mounted on the shared vehicle V, the vehicle cloud server 30 and the service cloud server 40 can communicate wiredly or wirelessly through the network 5.

(User Terminal)

Figure 2:
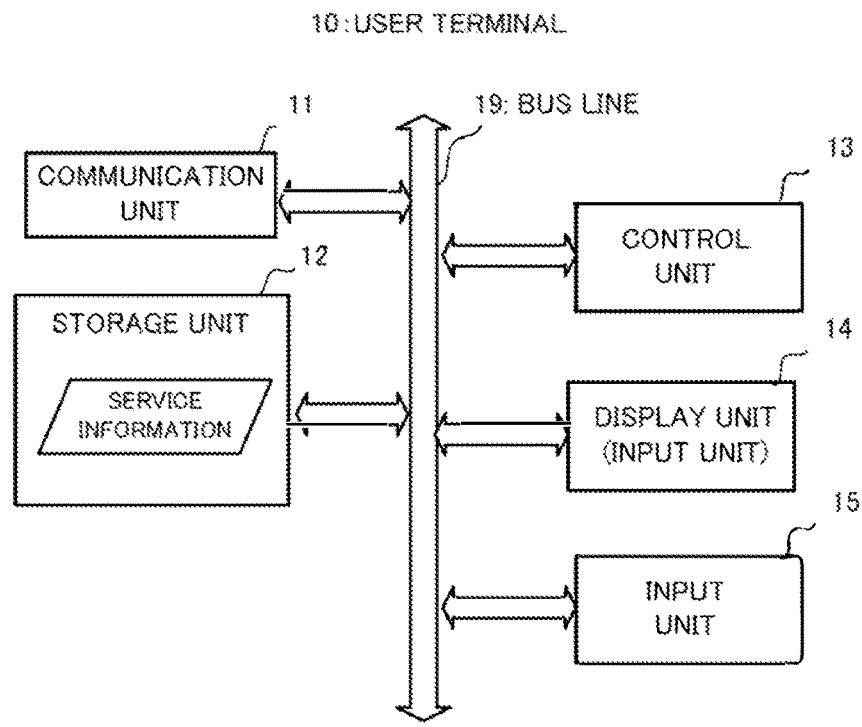
FIG. 2 is a block diagram illustrating an internal configuration of a user terminal.

Next, the user terminal will be described in detail. FIG. 2 is a block diagram illustrating the internal configuration of the user terminal 10. The user terminal 10 includes a communication unit 11, a storage unit 12, a control unit 13, a display unit 14 and an input unit 15. These components can communicate with each other through a bus line 19.

The communication unit 11 communicates with the external world by wireless communication. In this embodiment, the communication unit 11 mainly performs wireless communication with the onboard terminal 20 of the shared vehicle V. The storage unit 12 includes a ROM, a RAM, a flash memory and the like, and stores programs for various kinds of processing executed by the user terminal 10. The storage unit 12 is also used as a work memory when various kinds of processing are executed. Further, the storage unit 12 stores service information described later.

The control unit 13 is composed of a computer such as a CPU, and controls the entire user terminal 10. Specifically, the control unit 13 performs various processing by executing various programs stored in the storage unit 12. The display unit 14 is a liquid crystal display or the like, and displays various information. The input unit 15 is a touch panel or the like provided on the display unit 14, and is used when the user performs an instruction input.

(Onboard Terminal)

Figure 3:
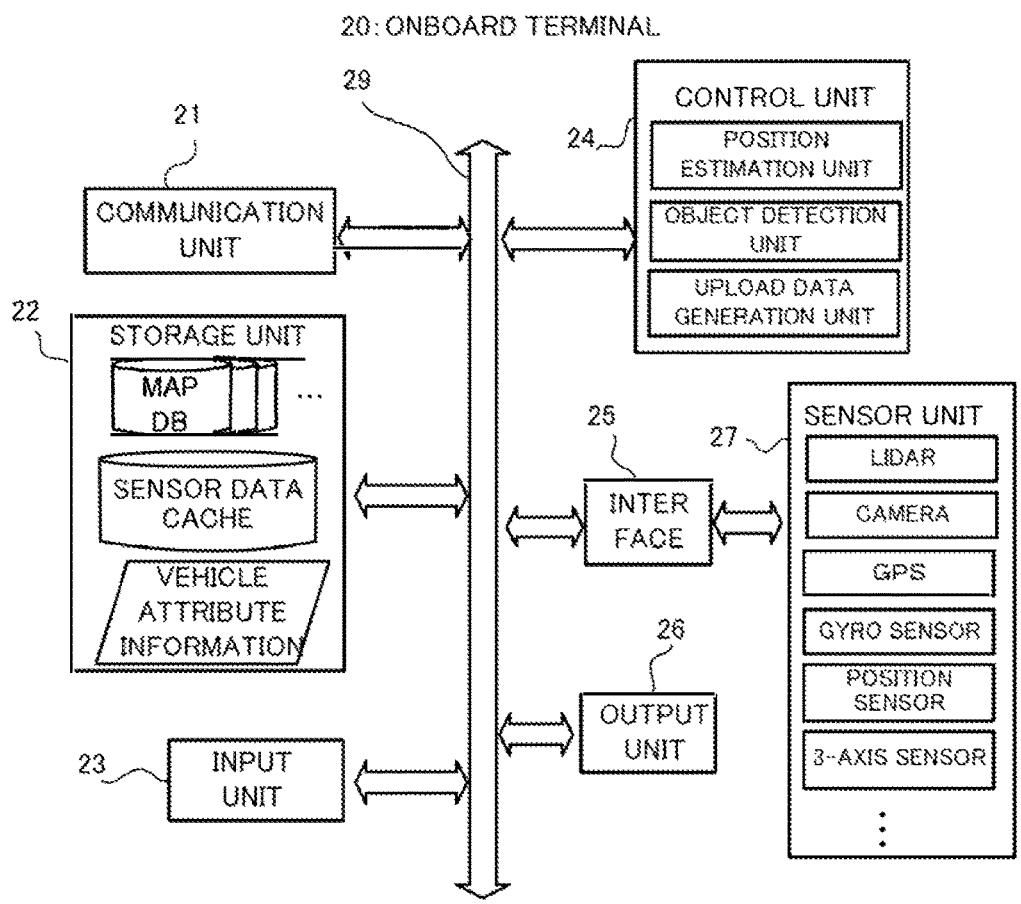
FIG. 3 is a block diagram illustrating an internal configuration of an onboard terminal.

Next, the onboard terminal 20 will be described in detail. FIG. 3 is a block diagram illustrating the internal configuration of the onboard terminal 20. As illustrated, the onboard terminal 20 mainly includes a communication unit 21, a storage unit 22, an input unit 23, a control unit 24, an interface 25 and an output unit 26. Each element in the onboard terminal 20 is connected to each other via a bus line 29. Further, the interface 25 is connected to the sensor unit 27.

Based on the control of the control unit 24, the communication unit 21 transmits various kinds of information acquired by the shared vehicle V (hereinafter, also referred to as "upload data") to the vehicle cloud server 30, and receives map data for updating the map DB from the vehicle cloud server 30. The communication unit 21 communicates with the user terminal 10 through wireless communication. Furthermore, the communication unit 21 may perform processing of transmitting a signal for controlling the vehicle to the vehicle, and processing of receiving a signal relating to the state of the vehicle from the vehicle.

The storage unit 22 stores programs executed by the control unit 24, and information necessary for the control unit 24 to execute predetermined processing. In this embodiment, the storage unit 22 stores a plurality of map DBs, sensor data cache and vehicle attribute information.

The map DB is a database including, for example, road data, facility data and ground feature data around the road. The road data include lane network data for route search, road shape data, traffic regulation data, etc. The ground feature data include information of signboards such as road signs, road marks such as stop lines, road division lines such as center lines and structures along roads. Further, the ground feature data may include high-precision point cloud information of the ground feature for use in the vehicle position estimation. In addition, various data necessary for position estimation may be stored in the map DB.

The sensor data cache is a cache memory for temporarily holding the output data of the sensor unit 27. Vehicle attribute information indicate information about the attribute of the shared vehicle V equipped with the onboard terminal 20, such as the type of vehicle, the vehicle ID, the vehicle size including the vehicle length, the vehicle width and the vehicle height, fuel type of the vehicle, etc.

The input unit 23 is a button, a touch panel, a remote controller, a voice input device or the like for the user's operation. For example, the input unit 23 receives an input for specifying a destination for the route search or an input for specifying ON or OFF of the autonomous driving, and supplies the generated input signal to the control unit 24. The output unit 26 is, for example, a display or a speaker or the like for outputting information based on the control of the control unit 24.

The interface 25 performs an interface operation for supplying the output data of the sensor unit 27 to the control unit 24 and the sensor data cache. The sensor unit 27 includes a plurality of external sensors for recognizing the peripheral environment of the vehicle such as a lidar and a camera, and internal sensors such as a GPS receiver, a gyro sensor, a position sensor, a 3-axis sensor. The lidar discretely measures the distance to an object existing in the external world, recognizes the surface of the object as a three-dimensional point cloud, and generates point cloud data. The camera generates image data taken from the vehicle. The position sensor is provided to detect the position of each external sensor, and the three-axis sensor is provided to detect the posture of each external sensor. The sensor unit 27 may include an external sensor and an internal sensor other than the external sensors and the internal sensors shown in FIG. 3. For example, the sensor unit 27 may include an ultrasonic sensor, an infrared sensor, a microphone or the like as an external sensor.

The control unit 24 includes a CPU or the like for executing predetermined programs on one or more platforms, and controls the entire onboard terminal 20. The control unit 24 functionally includes a position estimation unit, an object detection unit and an upload data generation unit.

The position estimating unit estimates the position of the own vehicle (including the attitude of the vehicle) based on the output data of the sensor unit 27 held in the sensor data cache and the map DB. The position estimating unit is capable of performing various position estimation methods. The position estimating unit executes, for example, an own-vehicle position estimation method by dead reckoning (autonomous navigation) based on the output of the autonomous positioning sensor such as a GPS receiver and a gyro sensor, an own-vehicle position estimation method for further collating the road data of the map DB to the autonomous navigation (map matching), an own-vehicle position estimation method based on the output data of the external sensors such as a lidar or a camera and the position information of the landmark indicated by ground feature information of the map DB based on a predetermined object (landmark) existing in the surroundings. Then, the position estimating unit executes the position estimation method that has the highest estimation accuracy among the currently executable position estimation methods, and supplies the vehicle position information indicating the vehicle position obtained based on the executed position estimation method to the upload data generating unit. The position estimating unit includes information specifying the executed position estimation method in the own-vehicle position information, and supplies the information to the upload data generating unit.

The object detecting unit detects a predetermined object based on the point cloud information, the image data, the voice data and the like output by the sensor unit 27. In this case, for example, the object detecting unit extracts the ground feature data corresponding to the object detected by the sensor unit 27 from the map DB based on the own-vehicle position estimated by the position estimating unit. When there is a difference between the position and the shape of the object detected by the sensor unit 27 and the position and the shape of the object indicated by the ground feature data extracted from the map DB, or when there is no corresponding ground feature data in the map DB, the object detection unit supplies information about the object detected by the sensor unit 27 to the upload data generation unit.

The upload data generating unit generates the upload data based on the own-vehicle position information supplied from the position estimating unit, the object data supplied from the object detecting unit and the output data of the sensor unit 27 supplied from the sensor data cache. Then, the upload data generating unit transmits the generated upload data to the vehicle cloud server 30 by the communication unit 21.

(Vehicle Cloud Server)

Figure 4A:
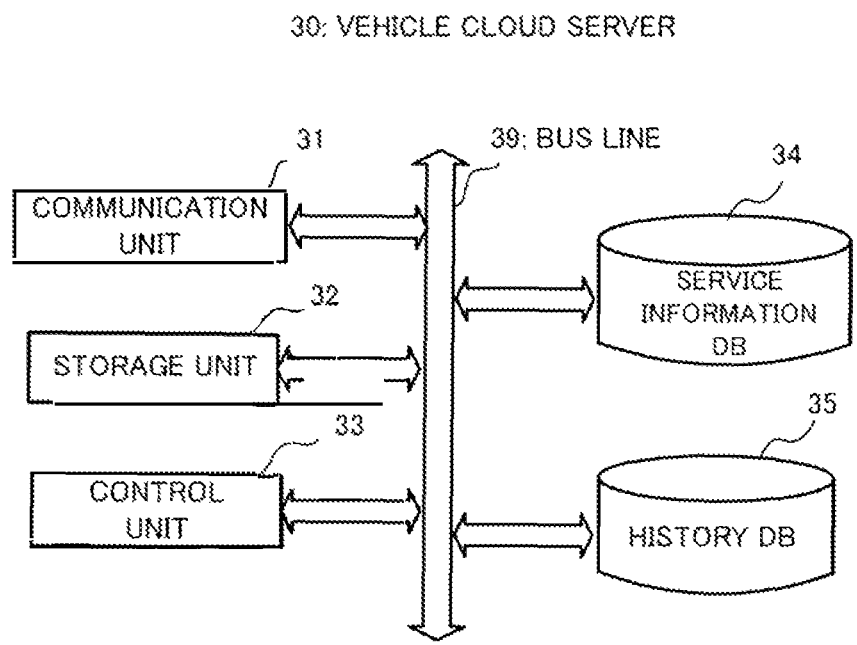
FIG. 4A is a block diagram illustrating an internal configuration of the vehicle cloud server.

Next, the vehicle cloud server 30 will be described in detail. FIG. 4A is a block diagram illustrating the internal configuration of the vehicle cloud server 30. As illustrated, the vehicle cloud server 30 includes a communication unit 31, a storage unit 32, a control unit 33, a service information DB 34 and a history DB 35. The elements in the vehicle cloud server 30 are connected with each other via a bus line 39.

The communication unit 31 communicates with the onboard terminal 20 of the shared vehicle V and the service cloud server 40 based on the control of the control unit 33. Specifically, the communication unit 31 receives the upload data from the onboard terminal 20, and transmits the information corresponding to the provision information described later to the service cloud server 40.

The storage unit 32 includes a ROM, a RAM and the like, and stores programs for various kinds of processing executed by the vehicle cloud server 30. The storage unit 32 is also used as a work memory when various kinds of processing are executed.

The control unit 33 is composed of a computer such as a CPU, and controls the entire vehicle cloud server 30. Specifically, by executing various programs stored in the storage unit 32, the control unit 33 performs various processing.

The service information DB 34 stores the service information transmitted from the onboard terminal 20. The service information will be described later in detail.

The history DB 35 stores the upload data acquired by the vehicle cloud server 30 from the onboard terminal 20. Specifically, the history DB 35 stores the information received from the onboard terminal 20 in association with the vehicle ID of the shared vehicle V mounting the onboard terminal 20 and the reception time. Further, the history DB 35 may store the provision information that the vehicle cloud server 30 transmitted to the service cloud server 40, as a history. In this case, in association with the provision information, information specifying the service cloud server 40 to which the provision information was transmitted.

In the above configuration, the communication unit 31 is an example of the reception unit, the transmission unit and the notification unit of the present invention. The storage unit 32 is an example of the storage unit of the present invention, and the control unit 33 is an example of the information providing unit and the deletion unit of the present invention.

(Service Cloud Server)

Figure 4B:
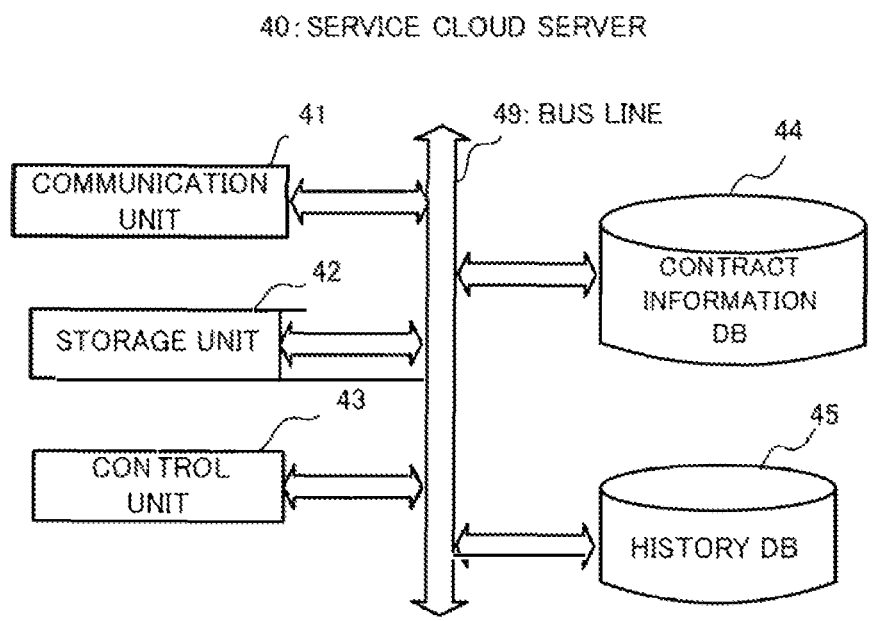
FIG. 4B is a block diagram illustrating an internal configuration of a service cloud server.

Next, the service cloud server 40 will be described in detail. FIG. 4B is a block diagram illustrating the internal configuration of the service cloud server 40. As illustrated, the service cloud server 40 includes a communication unit 41, a storage unit 42, a control unit 43, a contract information DB 44 and a history DB 45. The elements in the service cloud server 40 are connected to each other via a bus line 49.

The communication unit 41 communicates with the vehicle cloud server 30 under the control of the control unit 43. Specifically, the communication unit 41 receives information corresponding to the provision information described later from the vehicle cloud server 30.

The storage unit 42 includes a ROM, a RAM and the like, and stores programs for various kinds of processing executed by the service cloud server 40. The storage unit 42 is also used as a work memory when various kinds of processing are executed.

The control unit 43 is composed of a computer such as a CPU, and controls the entire service cloud server 40. Specifically, by executing various programs stored in the storage unit 42, the control unit 43 performs various processing.

The contract information DB 44 stores the contract information. The contract information is information that specifies the service contents provided by the service providing company operating the service cloud server 40 to the users using the shared vehicles V by the car sharing service. For example, if the service providing company is an insurance company, the contract information includes the contents of the insurance contract that the user has signed with the insurance company. In addition, the contract information includes the provision information based on the contract. That is, the contract information includes the information that the vehicle cloud server 30 should provide to the service providing company based on the contract.

The history DB 45 stores information that the service cloud server 40 acquired from the vehicle cloud server 30. This information is information transmitted from the vehicle cloud server 30 as the information corresponding to the provision information indicating the information requested by the service providing company, among the information that the vehicle cloud server 30 acquired from the onboard terminal 20. Specifically, the history DB 45 stores the information received from the vehicle cloud server 30 in association with the information identifying the vehicle cloud server 30 that transmitted the information, a reception time and the like.

[Service Information]

Next, the service information will be described. The service information is the information related to the services that users using the shared vehicle V have contracted with various service providing companies. The service information is stored in the storage unit 12 of the user terminal 10 as shown in FIG. 2.

FIG. 5 illustrates an example of the service information. As illustrated, the service information includes a "shared vehicle user ID," "vehicle cloud," "service cloud user ID," "provision information," and "destination address".

The "shared vehicle user ID" is the ID of the user registered to the shared vehicle operation company. A shared vehicle operation company is a company that provides shared vehicle V to users. As mentioned above, the shared vehicle V is an autonomous driving vehicle manufactured by multiple automobile manufacturers. The shared vehicle operation company prepares the autonomous driving vehicles of those automobile manufacturers by purchasing them, and provides them to the users. At this time, the user makes a user contract with the shared vehicle operation company. The ID given to the user from the shared vehicle operation company at that time is the shared vehicle user ID.

The "vehicle cloud" refers to the vehicle cloud with which the shared vehicle operation company used by the users made contract. In this embodiment, it is assumed that the shared vehicle operation company is a company that provides the user with the shared vehicle V manufactured and managed by the automobile manufacturers A and B. In this case, the shared vehicle operation company purchases the autonomous driving vehicles of the automobile manufacturers A and B, and provides them to the users as the car sharing service, for example. Also, the shared vehicle operation company asks the information collection company operated by those automobile manufacturers to manage the shared vehicle V provided to the users. Therefore, the service information stored in the user terminal 10 includes the information relating to the vehicle cloud operated by the automobile manufacturers A and B as the information collection company. In the example shown in FIG. 5, the vehicle cloud "CL001" operated by the automobile manufacturer A and the vehicle cloud "CL002" operated by the automobile manufacturer B are stored. When a shared vehicle operation company makes a contract with a new information collection company, that vehicle cloud will be added.

While the user is using the shared vehicle V provided by the shared vehicle operation company, the onboard terminal 20 of the shared vehicle V transmits various information acquired during the traveling to the vehicle cloud server 30 as the upload data. For example, if the user is provided with the shared vehicle V of the automobile manufacturer A from the shared vehicle operation company, the onboard terminal 20 of the shared vehicle V uploads the information obtained during the traveling to the vehicle cloud "CL001" of the information collection company operated by the automobile manufacturer A.

The "service cloud user ID" is the user ID for the service cloud operated by the service providing company with which the user made a contact. The service cloud user ID is registered for each vehicle cloud operated by an automobile manufacturer. In the example of FIG. 5, with respect to the vehicle cloud CL001 operated by the automobile manufacturer A, the userm made contracts with an insurance company, a map service company, a parking lot service company and a route search service company. Therefore, when the user uses the shared vehicle V of the automobile manufacturer A, the user can receive the services by the insurance company, the map service company, the parking lot service company and the route search service company. Specifically, in the example of FIG. 5, the service cloud user ID for the insurance company is "XXXX1", the service cloud user ID for the map service company is "ZZZZ1", the service cloud user ID for the parking lot service company is "WWWWW", and the service cloud user ID for the route search service company is "RRRRR".

Similarly, with respect to vehicle cloud CL002 operated by the automobile manufacturer B, the user made contracts with the insurance company and the map service company. Therefore, the users can receive the services by the insurance company and the map service company when using the shared vehicle V of the automobile manufacturer B. Specifically, in the example of FIG. 5, the service cloud user ID for the insurance company is "XXXX2" and the service cloud user ID for the map service company is "ZZZZ2." In some cases, one service providing company provides the service to the user by using the service of another service providing company. Specifically, in the case where the route search service company contracts with the map service company, the route search service company can provide the user with the latest map and the route search service based on the latest map, thereby improving the service level for the user. In this case, the route search service company may receive the service directly from the map service company to obtain the latest map. Alternatively, the service cloud user ID of the map service company may be supplied from the route search service company to the user so that the user can directly receive the service from the map service company.

The "provision information" indicates the information to be provided to each service cloud server 40, among various kinds of information that the vehicle cloud server 30 obtained from the onboard terminal 20. For example, in the example of FIG. 5, for the insurance company, "shooting information by the camera for N minutes before and after the occurrence of the accident" is specified as the provision information. This is obtained by shooting the outside of the vehicle with an onboard camera, which is one of the sensors mounted on the shared vehicle V, and it is useful information to clarify the situation at the time of the accident and the cause of the accident. When an accident occurs to the shared vehicle V, the service cloud server 30 transmits the shooting information by the camera for N minutes before and after the occurrence of the accident among the information obtained from the onboard terminal 20 of the shared vehicle V to the service cloud server 40 of the insurance company. The insurance company can provide adequate insurance services based on the shooting information of the shared vehicle V.

Similarly, for the map service company, "recognized object information" and "travel route information" are defined as the provision information. Therefore, the service cloud server 30 transmits the recognized object information and the travel route information among the information acquired from the onboard terminal 20 of the shared vehicle V to the service cloud server 40 of the map service company. The map service company can update map data based on those information. Also, the map service company can provide the contracted users of the shared vehicle V with the service of supplying the latest maps with updated data.

For the parking lot service company, "user's destination" is set as the provision information. Therefore, among the information obtained from the onboard terminal 20 of the shared vehicle V, the service cloud server 30 transmits the destination set by the user to the service cloud server 40 of the parking lot service company. The parking lot service company notifies the terminal device 20 of a parking lot capable of parking the shared vehicle V, among the parking lots in the vicinity of the destination, via the vehicle cloud server 30. Thus, the shared vehicle V can be automatically parked in the parking lot near the destination by autonomous driving.

For the route search service company, "starting point/destination/on-route point" and "traveling area" are set as the provision information. Therefore, among the information acquired from the onboard terminal 20 of the shared vehicle V, the service cloud server 30 transmits the "starting point/destination/on-route point" and the "traveling area" set by the user to the service cloud server 40 of the route search service company. The route search service company notifies the terminal device 20 of the travel route along the user's desire via the vehicle cloud server 30 based on the information of the "starting point/destination/on-route point" and the "traveling area". Thus, the shared vehicle V can reach from the starting point to the destination on an appropriate route by autonomous driving.

The "destination address" indicates the address to which the information corresponding to the provision information is transmitted, i.e., the address of the service cloud. In the example of FIG. 5, when an accident occurs to the shared vehicle V, the vehicle cloud server 30 transmits the shooting information by the camera for N minutes before and after the accident to the address "xxx.xxx.co.jp".

[Registration Processing of Service Information]

Next, processing of registering the above-described service information to the user terminal 10 and the onboard terminal 20 will be described. FIG. 6 is a flowchart of the service information registration processing. First, after starting the application program in the user terminal 10, the user enters the shared vehicle user ID and the service cloud user ID into the user terminal 10, and the user terminal 10 receives them (Step S11). The shared vehicle user ID is the user ID assigned to the user by the shared vehicle operation company, and the service cloud user ID is the user ID assigned to the user by each service providing company. If the user has made contracts with multiple service providing companies, the user enters the service cloud user ID of each service providing company.

The user terminal 10 transmits the service cloud user ID received in step S11 to the service cloud server 40 operated by the corresponding service providing company (step S12). The service cloud server 40 refers to the contract information DB 44, acquires the provision information corresponding to the user's contract (step S13), and transmits the provision information to the user terminal 10 together with the destination address of the service cloud server 40 (step S14).

As described above, the service providing company A having a contract with the user (e.g., the route search service company) may provide a service by utilizing the service of another service providing company B (e.g., the map service company). When the service providing company A provides the service cloud user ID of the service providing company B to the user, it is preferred that the user ID of the service providing company B is transmitted from the service providing company A to the user terminal 10 in step S13 and automatically registered to the user terminal 10. In this case, when the user ID of the service providing company B is registered, the user terminal 10 transmits the service cloud user ID to the service cloud server 40 operated by the service providing company B by the process in step S12. Alternatively, the service cloud server 40 of the service providing company A may acquire the provision information and the destination address from the service cloud server 40 of the service providing company B, and transmit the information to the user terminal 10 together with the service cloud user ID of the service providing company B to register the information.

The user terminal 10 stores the received provision information and the destination address in the storage unit 12 as the service information in association with the service cloud user ID (step S15). Thus, the service information as shown in FIG. 5 is stored in the user terminal 10.

Thereafter, when the user uses the shared vehicle V, the service information is transmitted from the user terminal 10 to the onboard terminal 20 (step S16). For example, when the user operates the user terminal 10 or the onboard terminal 20, the communication between the user terminal 10 and the onboard terminal 20 is established, and the service information is transmitted from the user terminal 10 to the onboard terminal 20. When receiving the service information from the user terminal 10, the onboard terminal 20 stores the service information in the service information DB 34 and transmits the service information to the vehicle cloud server 30 (step S17). In this case, the onboard terminal 20 transmits only a part of the information related to the vehicle cloud server 30 of the transmission destination among the service information. For example, when the onboard terminal 20 receives the service information shown in FIG. 5 from the user terminal 10, the onboard terminal device 20 transmits only the part of the information corresponding to the vehicle cloud CL001 shown in FIG. 7A to the vehicle cloud server 30 of the vehicle cloud CL001, and transmits only the part of the information corresponding to the vehicle cloud CL002 shown in FIG. 7B to the vehicle cloud server 30 of the vehicle cloud CL002.

[Use Start Processing]

Next, the processing by which the user starts using the shared vehicle V will be described.

First Example

Figure 8:
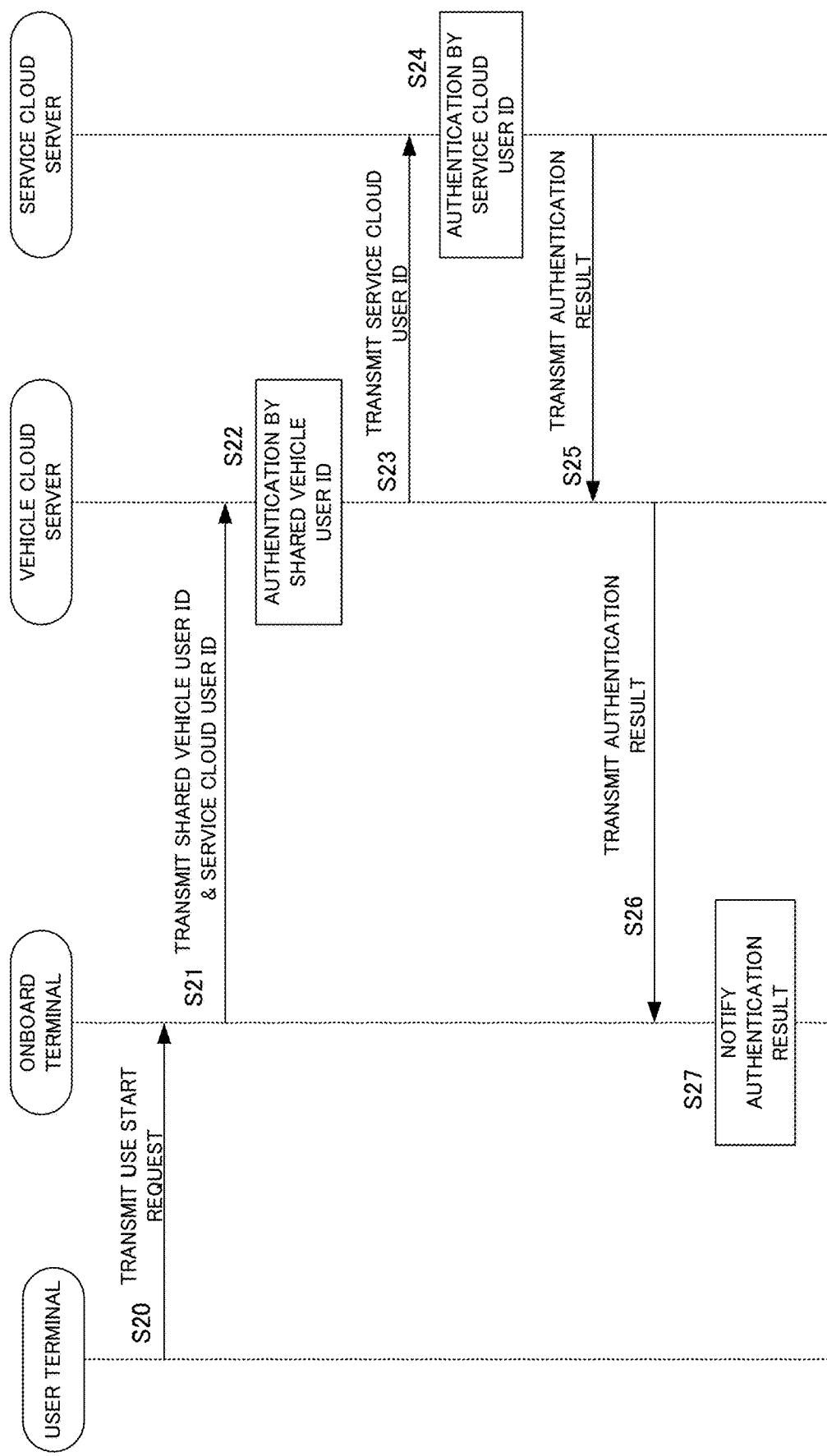
FIG. 8 is a flowchart of a first example of use start processing.

In the first example, the service cloud server 40 authenticates the user based on the service cloud user ID. FIG. 8 is a flowchart of a first example of the use start processing. As a premise, as shown in step S16 of FIG. 6, it is assumed that the onboard terminal 20 has received and stored the service information from the user terminal 10.

First, when the user performs an instruction input to start the use of the shared vehicle V by operating the user terminal 10, the user terminal 10 transmits a use start request to the onboard terminal 20 (step S20). The onboard terminal 20 acquires the shared vehicle user ID and the service cloud user ID associated with the vehicle cloud for the shared vehicle V by referring to the service information of the user, and transmits them to the vehicle cloud server 30 (step S21).

The vehicle cloud server 30 performs authentication based on the shared vehicle user ID received from the onboard terminal 20 (step S22). Namely, the vehicle cloud server 30 determines whether the user has a user contract with the shared vehicle operation company. Upon successful authentication, the vehicle cloud server 30 transmits the service cloud user ID to the corresponding service cloud server 40 (step S23). Incidentally, when the authentication fails, the vehicle cloud server 30 notifies the failure to the onboard terminal 20, and the processing ends.

The service cloud server 40 performs authentication based on the service cloud user ID received from the vehicle cloud server 30 (step S24). Specifically, the service cloud server 40 refers to the contract information DB 44, and determines whether or not a contract corresponding to the service cloud user ID validly exists. Then, the service cloud server 40 transmits the authentication result to the vehicle cloud server 30 (step S25).

The vehicle cloud server 30 transmits the authentication result received from the service cloud server 40 to the onboard terminal 20 (step S26). The onboard terminal 20 notifies the user of the authentication result by display by the output unit 26 or the like. Thus, the processing ends.

Second Example

Figure 9:
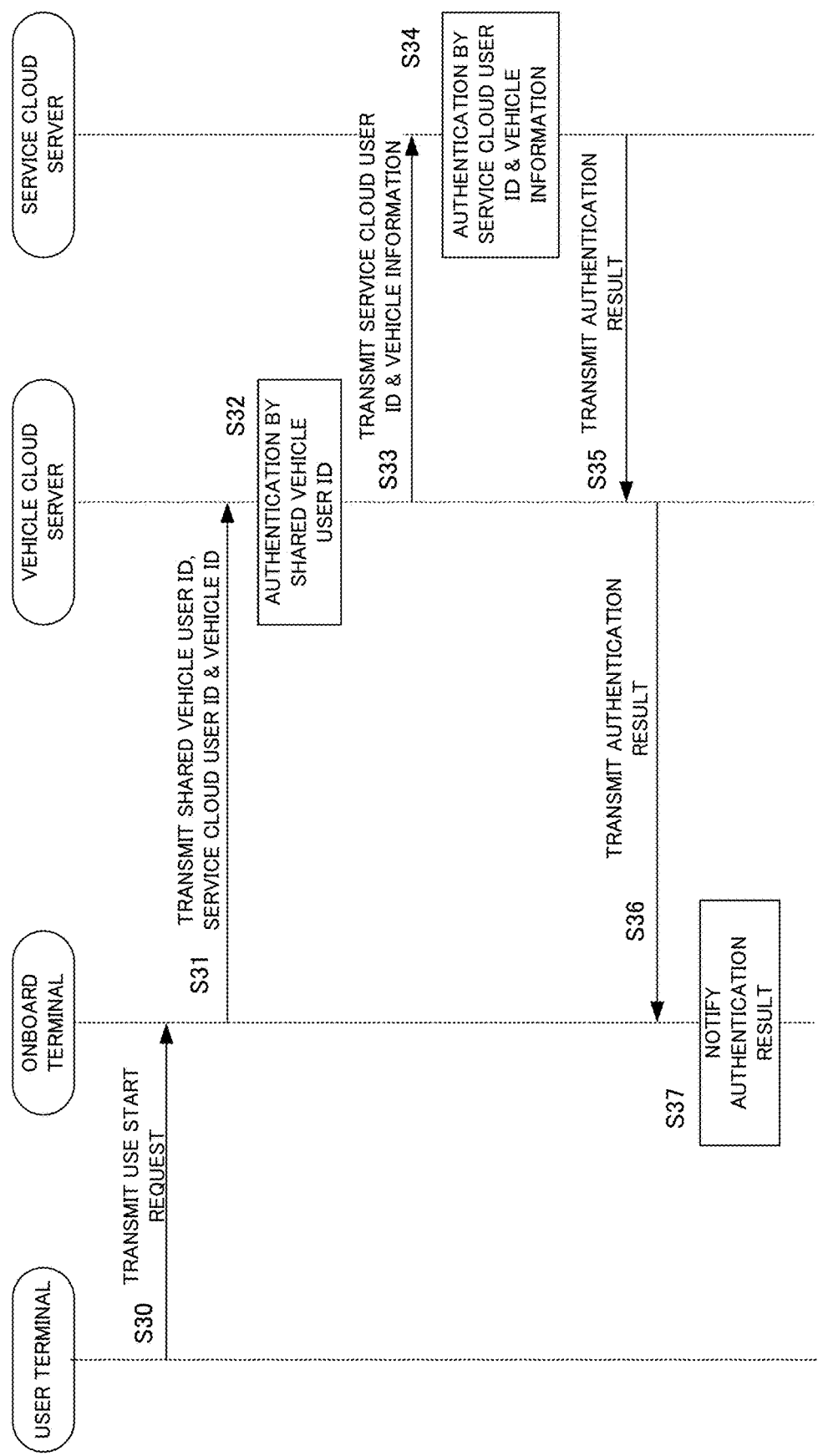
FIG. 9 is a flowchart of a second example of the use start processing.

In the second example, the service cloud server 40 authenticates the user based on the service cloud user ID and the vehicle information. FIG. 9 is a flowchart of a second example of the use start processing. As a premise, as shown in step S16 of FIG. 6, it is assumed that the onboard terminal 20 has received and stored the service information from the user terminal 10.

First, when the user performs an instruction input of starting the use by operating the user terminal 10, the user terminal 10 transmits a use start request to the onboard terminal 20 (step S30). The onboard terminal 20 acquires the shared vehicle user ID and the service cloud user ID associated with the vehicle cloud for the shared vehicle V by referring to the service information of the user, and transmits them to the vehicle cloud server 30 together with the vehicle ID of the shared vehicle V on which the onboard terminal 20 itself is mounted (step S31).

The vehicle cloud server 30 performs authentication based on the shared vehicle user ID received from the onboard terminal 20 (step S32). Namely, the vehicle cloud server 30 determines whether or not the user has a user contract with the shared vehicle operation company. When the authentication is successful, the vehicle cloud server 30 acquires the vehicle information (e.g., information about the vehicle type of the shared vehicle V, the travel distance, information about the failure location, etc.) based on the vehicle ID, and transmits the service cloud user ID and the vehicle information to the service cloud server 40 (step S33). Incidentally, when the authentication fails, the vehicle cloud server 30 transmits that to the onboard terminal 20, and the processing ends.

The service cloud server 40 performs authentication based on the service cloud user ID and the vehicle information received from the vehicle cloud server 30 (step S34). Specifically, the service cloud server 40 refers to the contract information DB 44, and determines whether or not the contract corresponding to the service cloud user ID is valid and whether or not the vehicle information satisfies the condition specified in the contract. For example, in case of the service cloud server 40 of the insurance company, it is determined whether or not the vehicle that the user intends to use satisfies the conditions of the vehicle specified in the insurance contact of the user. For example, it is assumed that the insurance contract includes a condition that the insurance service can be applied only when the user is using a vehicle of a specific type. This means that, for example, if the user uses a certain type of vehicle having a high accident rate is used, the insurance company does not provide the insurance service. In this case, if the user uses a vehicle of a type different from the insurance contract, the authentication is not successful. Similarly, if the insurance contract includes such a condition that the insurance service is applicable only when the traveling distance of the vehicle used by the user is within a predetermined range, the authentication is not successful when the user uses the vehicle whose traveling distance is larger than the predetermined distance.

If a contract corresponding to the service cloud user ID exists validly and the vehicle information satisfies the conditions specified in the contract, the service cloud server 40 determines that the authentication is successful. Then, the service cloud server 40 transmits the authentication result to the vehicle cloud server 30 (step S35).

The vehicle cloud server 30 transmits the authentication result received from the service cloud server 40 to the onboard terminal 20 (step S36). The onboard terminal 20 notifies the authentication result to the user by the display by the output unit 26 or the like (step S37). Thus, the processing ends.

In the second example, since the service cloud server 40 not only verifies the service cloud user ID, but also verifies the vehicle that the user intends to use with the conditions of the vehicle in the user's contract to perform the authentication, the service cloud server 40 can appropriately perform the authentication even when there are various contract conditions between the user and the service providing company.

In the above embodiment, the vehicle information is described as a condition of providing the insurance service. However, for example, the driving range of the shared vehicle V (i.e., the area or driving path the user is going to travel) may be used as a condition of providing the insurance service. This may be a case of such a contract that the insurance service is not applied when a user travels in a hazardous area. In this case, instead of the vehicle information, the service cloud server 40 receives the information about the user' destination or the traveling route to the destination from the terminal device 20 via the vehicle cloud server 30. Then, when a contract corresponding to the service cloud user ID validly exists and the traveling range of the shared vehicle V satisfies the conditions specified in the contract, the service cloud server 40 determines that the authentication is successful.

[Providing Information From the Vehicle Cloud Server to the Service Cloud Server]

Next, processing of providing information from the vehicle cloud server 30 to the service cloud server 40 will be described. The vehicle cloud server 30 is operated by an information collection company. The vehicle cloud server 30 regularly acquires various types of information from the onboard terminal 20 of the shared vehicle V, and stores the information in the history DB 35. On the other hand, while the service cloud server 40 does not require all the information that the vehicle cloud server 30 acquired from the onboard terminal 20, the server cloud server 40 requires specific information to provide the service to the user. From this point of view, the information required for each service cloud is specified as the provision information, and the service information including the provision information is given to the vehicle cloud server 30. The vehicle cloud server 30 provides only the necessary information to the service cloud server 40 in accordance with the provision information.

In the example of the service information shown in FIG. 5, for example, when an accident occurs to the shared vehicle V, the vehicle cloud server 30 transmits only the shooting information by the camera for N minutes before and after the occurrence of the accident among the various information acquired from the onboard terminal 20 to the service cloud server 40 of the insurance company. Also, when the detection result of the object acquired by the sensor unit 27 of the shared vehicle V is different from the map information, the vehicle cloud server 30 transmits the object recognition information including that fact and the location information to the service cloud server 40 of the map service company. The service cloud server 40 stores the information thus received from the vehicle cloud server 30 in the history DB 45. Further, the vehicle cloud server 30 may store the information transmitted to the service cloud server 40 in the history DB 35.

Figure 10:
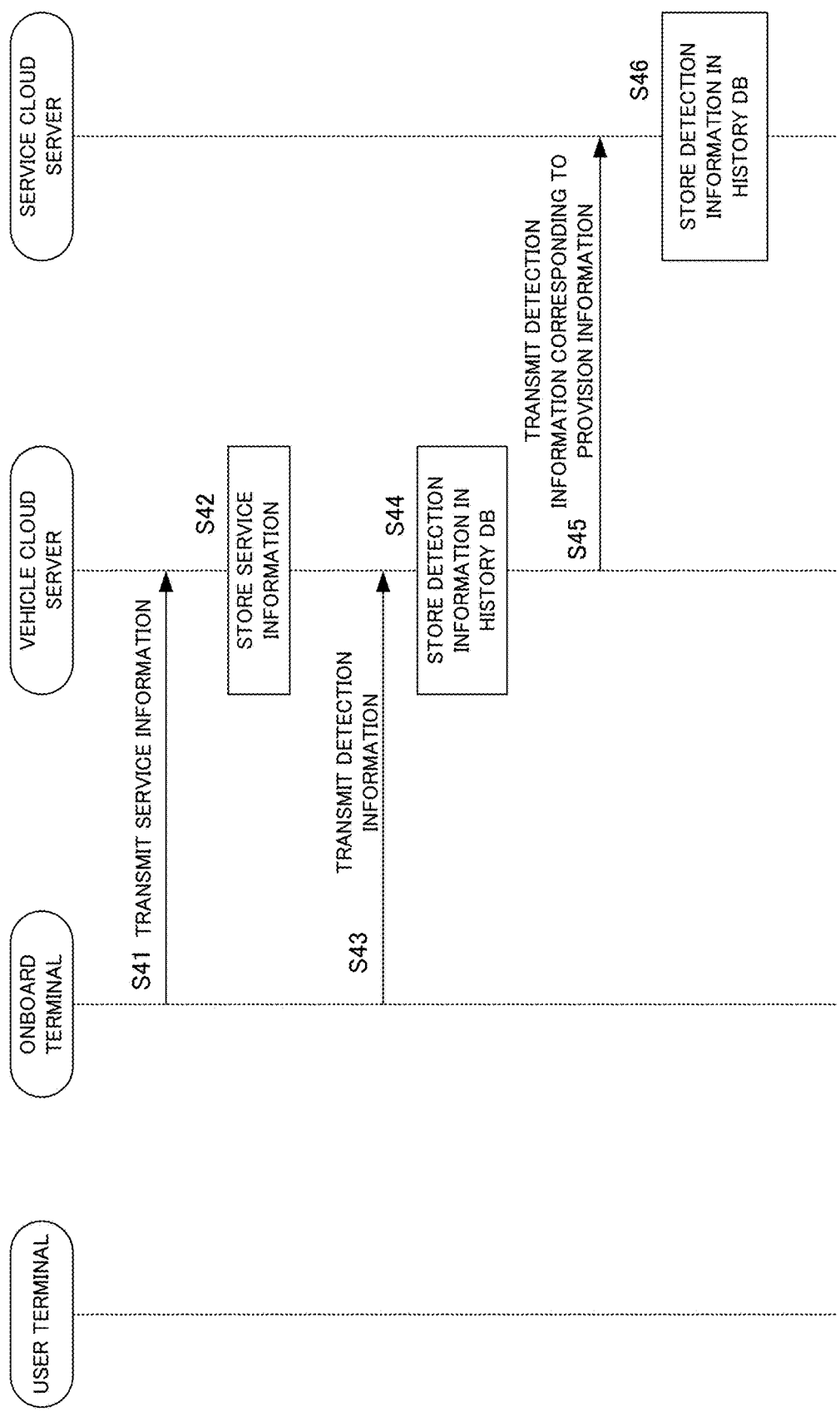
FIG. 10 is a flowchart of information providing processing to the service cloud server.

FIG. 10 is a flow chart of information providing processing from a vehicle cloud server to a service cloud server. As a premise, as shown in step S16 of FIG. 6, the onboard terminal 20 receives and stores the service information from the user terminal 10.

First, the onboard terminal 20 transmits the service information to the vehicle cloud server 30 (step S41). The vehicle cloud server 30 stores the received service information in the service information DB 34 (step S42). Here, it is assumed that the vehicle cloud server 30 performs authentication based on the shared vehicle user ID received from the onboard terminal 20 in step S22 of FIG. 8, and the onboard terminal 20 receives the result indicating that the authentication is successful in step S27 of FIG. 8.

While the shared vehicle V is traveling, the onboard terminal 20 transmits various information (hereinafter referred to as "detection information") acquired by the sensor unit 27 or the like to the vehicle cloud server 30 (step S43). The vehicle cloud server 30 stores the received detection information in the history DB 35 (step S44).

Next, the vehicle cloud server 30 refers to the service information, and transmits the detection information corresponding to the provision information defined for each service cloud among the detection information received from the onboard terminal 20 to the service cloud server 40. For example, in the example of FIG. 5, the vehicle cloud server 30 of the vehicle cloud CL001 transmits the shooting information for N minutes before and after the occurrence of the accident to the service cloud server 40 of the insurance company (i.e., to the destination address "xxx.xxx.co.jp"). The service cloud server 40 stores the received detection information in the history DB 45.

Thus, by providing the vehicle cloud server 30 with the service information including the provision information, the vehicle cloud server 30 can efficiently transmit only the information required by the service providing company among the various detection information acquired by the onboard terminal 20 to the service cloud server 40.

When the vehicle cloud server 30 transmits the detection information corresponding to the provision information to the service cloud server 40, it is preferred that the vehicle cloud server 30 stores the history information indicating the detection information that the vehicle cloud server 30 transmitted to the service cloud server 40 in the history DB 35.

[Use End Processing]

Figure 11:
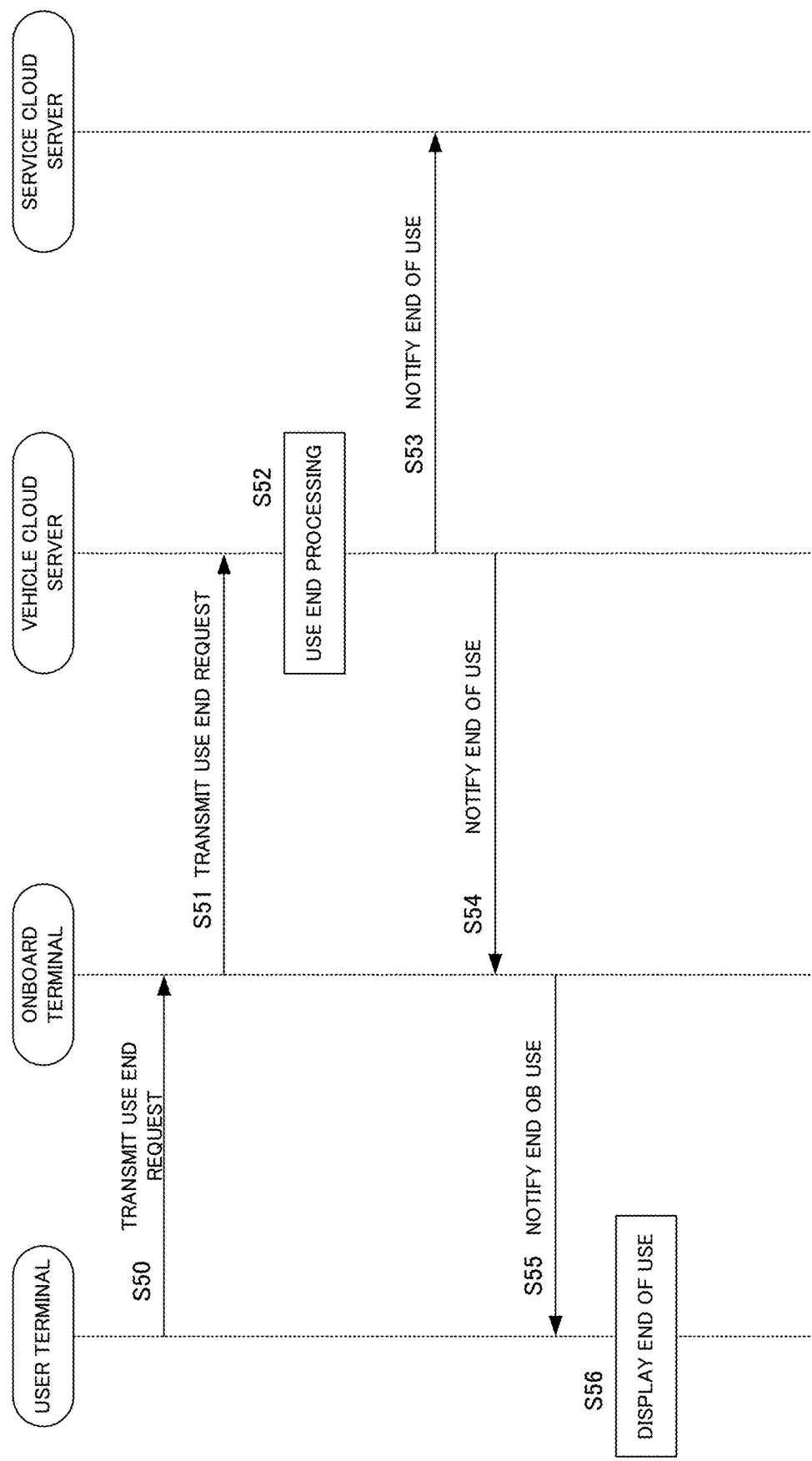
FIG. 11 is a flowchart of use end processing of the shared vehicle.

Next, processing for ending the use of the shared vehicle V by the user will be described. FIG. 11 is a flowchart of the use end processing executed when the user ends the use of the shared vehicle V. When the user enters a use ending instruction into the user terminal 10, the user terminal 10 transmits a use end request to the onboard terminal 20 (Step S50). For example, while the user is using the shared vehicle V, the user terminal 10 may display a button for instructing the end of use (e.g., a "get off" button) or the like, and when the user presses the button, the user terminal 10 may determine that the instruction to end the use has been input.

Upon receiving the use end request from the user terminal 10, the onboard terminal 20 transmits the use end request to the vehicle cloud server 30 (step S51). Upon receiving the use end request, the vehicle cloud server 30 performs the use end processing (step S52). Specifically, the vehicle cloud server 30 cancels registration of the user as the user of the shared vehicle V, and terminates transmission of the detection information to the service cloud server 40. The vehicle cloud server 30 notifies the service cloud server 40 of the end of the use by the user (step S53). Thus, the service cloud server 40 recognizes that the use of the shared vehicle V by the user has been ended and that the transmission of the detection information from the vehicle cloud server 30 is stopped.

Further, the vehicle cloud server 30 transmits a notification of use ending indicating that the use end processing has been performed to the onboard terminal 20 (step S54). Upon receiving the notification of the use ending from the vehicle cloud server 30, the onboard terminal 20 transmits the notification of the use ending to the user terminal 10 (step S55). The user terminal 10 displays the end of use on the display unit 14 (step S56), and notifies the user that the use by the user has been correctly ended.

[History Deletion Process]

Next, processing of deleting the history information stored in the vehicle cloud server 30 and the service cloud server 40 will be described. As described above, the vehicle cloud server 30 stores the information acquired from the onboard terminal 20 in the history DB 35 while the user uses the shared vehicle V. Further, the service cloud server 40 receives the detection information corresponding to the provision information from the vehicle cloud server 30 during use of the shared vehicle V by the user, and stores the detection information in the history DB 45. Since these provision information is personal information for the user, some users does not want the provision information to be kept recorded in the information collection company or the service providing company even after the provision of the service from the service providing company is ended. Therefore, the user can request the deletion of these history information after ending the use of the shared vehicle V. The vehicle cloud server 30 and the service cloud server 40 delete the history information based on the deletion request by the user.

Figure 12:
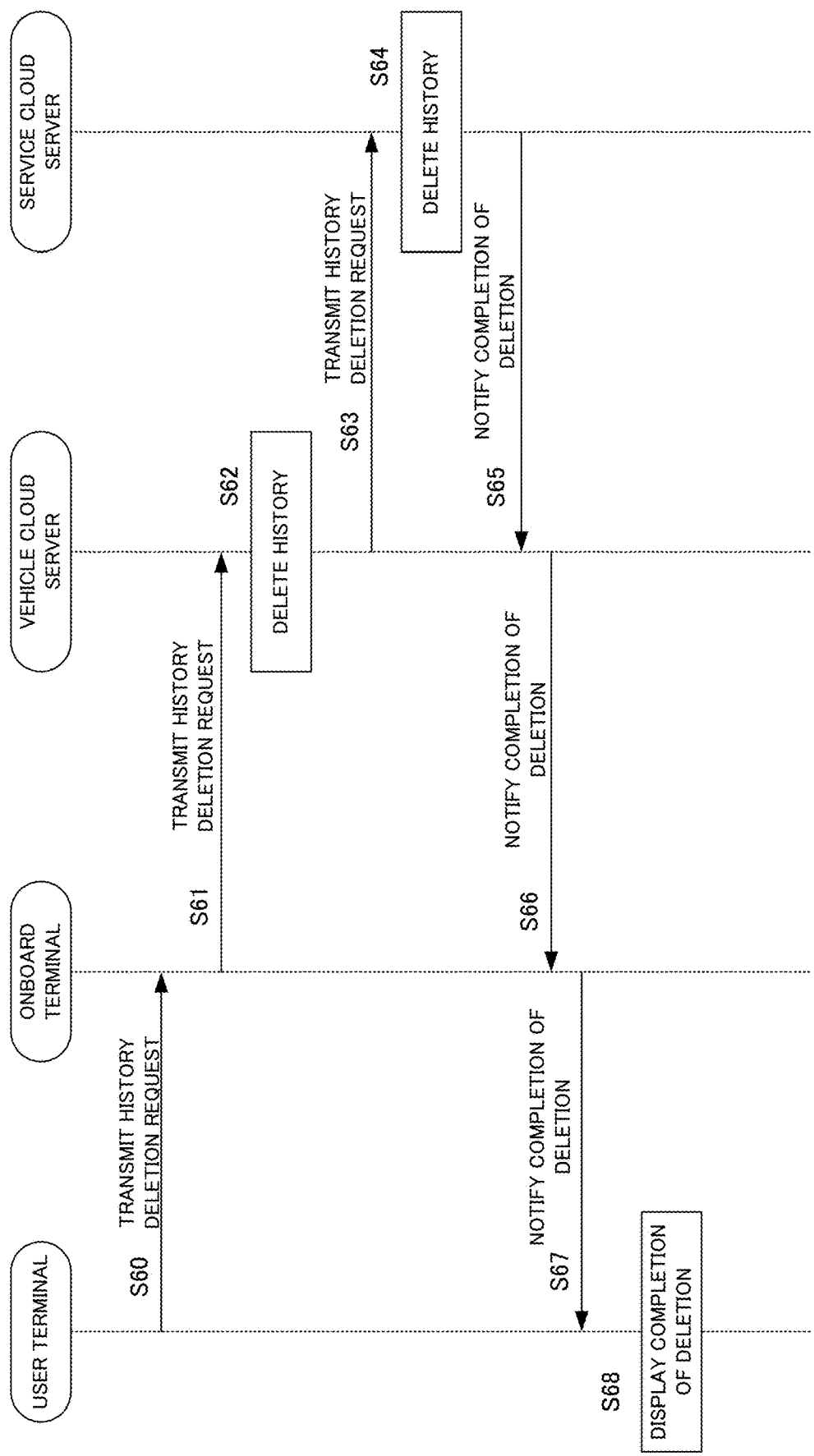
FIG. 12 is a flowchart of history deletion processing.

FIG. 12 is a flowchart of history deletion processing. First, the user operates the user terminal 10 to transmit a history deletion request to the onboard terminal 20 (step S60). The history deletion request includes the shared vehicle user ID of the user. When receiving the history deletion request from the user terminal 10, the onboard terminal 20 transmits the history deletion request to the vehicle cloud server 30 (step S61).

When receiving the history deletion request, the vehicle cloud server 30 deletes the history information corresponding to the shared vehicle user ID included in the history deletion request among the history information stored in the history DB 35 (step S62). Further, the vehicle cloud server 30 transmits the history deletion request to the service cloud server 40 (step S63). At that time, the vehicle cloud server 30 refers to the service information, and transmits the history deletion request including the service cloud user ID to the service cloud server 40.

When receiving the history deletion request, the service cloud server 40 deletes the history information corresponding to the service cloud user ID included in the history deletion request among the history information stored in the history DB 45 (step 64). The service cloud server 40 transmits a notification of completion of deletion indicating that the history information has been deleted to the vehicle cloud server 30 (step S65).

When receiving the notification of completion of deletion from the service cloud server 40, the vehicle cloud server 30 transmits the notification of completion of deletion to the onboard terminal 20 (step S66). This notification indicates that both the deletion of the history in the vehicle cloud server 30 and the deletion of the history in the service cloud server 40 have been completed.

Upon receiving the notification of completion of deletion from the vehicle cloud server 30, the onboard terminal 20 transfers the notification of completion of deletion to the user terminal 10 (step S67). Upon receiving the notification of the deletion completion from the onboard terminal 20, the user terminal 10 performs a display indicating that the deletion has been completed on the display unit 14 (step S68). This allows the user to know that the history information has been deleted correctly.

In the above example, the history deletion request by the user is transmitted to the vehicle cloud server 30 through the onboard terminal 20. Instead, the history deletion request may be transmitted directly from the user terminal 10 to the vehicle cloud server 30. In addition, the history deletion request may include a range of information to be deleted, for example, the date and time when the information was transmitted. In this case, the vehicle cloud server 30 and the service cloud server 40 delete the history information corresponding to the specified date and time. Also, when the information about the amount of information transmitted to the service cloud server 40 (e.g., the amount of data, the number of record, etc.) is stored for each service cloud user ID, the vehicle cloud server 30 may receive the information about the amount of the information deleted by the service cloud server 40 together with the notification of the completion of deletion from the service cloud server 40. In this case, the vehicle cloud server 30 can verify that the history information has been deleted certainly, and transmit the notification of the completion of deletion to the onboard terminal 20.

[Utilization of Biometric Authentication]

Next, description will be given of a method of utilizing biometric information in the authentication of users using the shared vehicle V. When the users use the vehicle cloud or the service cloud, it is necessary to prevent spoofing. An example of spoofing is that, after a user X completes the authentication for the vehicle cloud and the service cloud, another user Y uses the shared vehicle V. If this happens, the service providing company needs to provide services to the user Y who has not made the contract, based on the contract with the user X. Therefore, the authentication using biometric information is carried out at the time of starting the use and during the actual use of the shared vehicle V.

Figure 13:
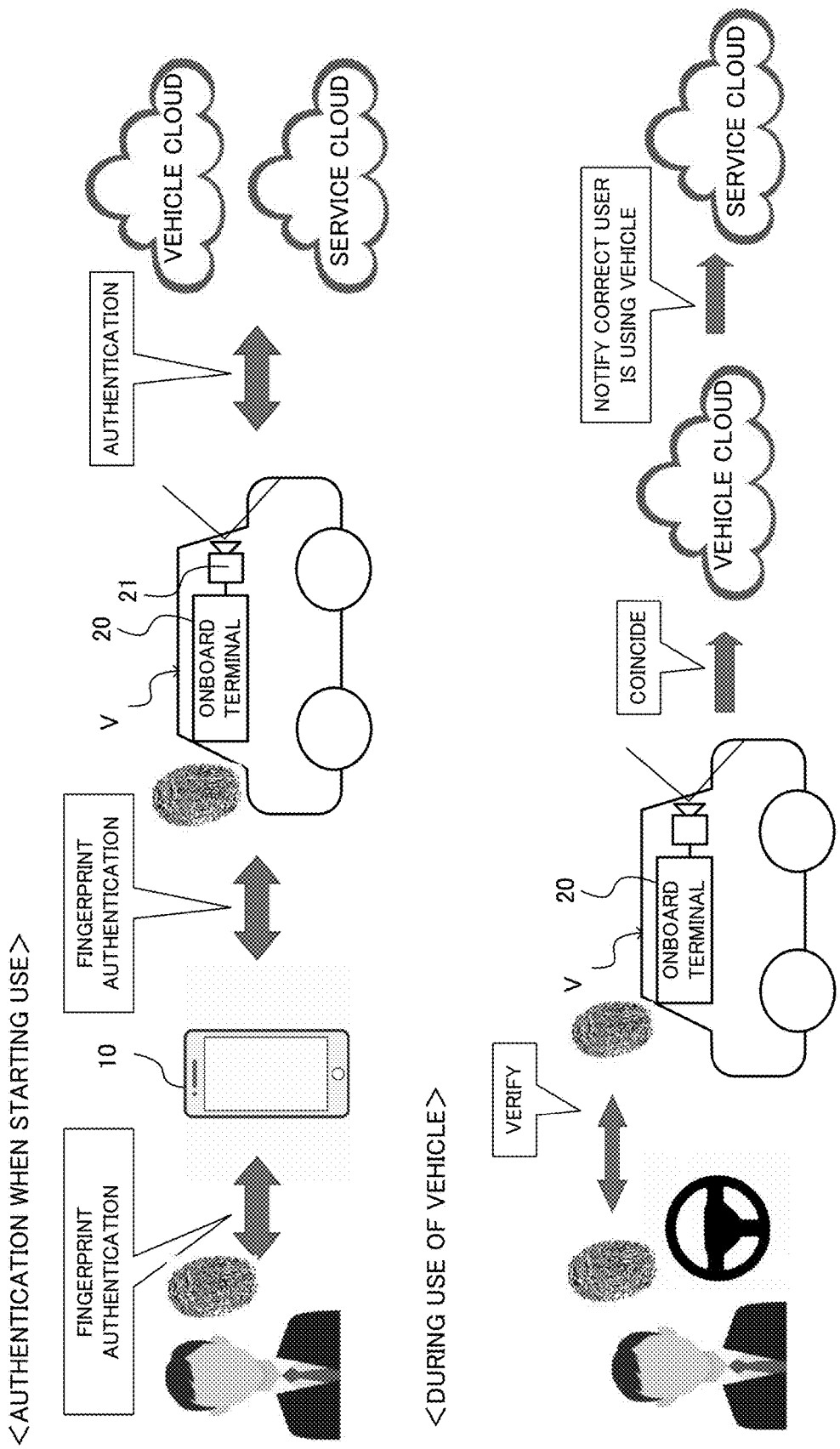
FIG. 13 is schematically illustrates an authentication method using biometric information.

FIG. 13 schematically illustrates a method of authentication using biometric information. In the following example, fingerprint information shall be used as biometric information. First, at the time of authentication for starting use, fingerprint authentication is performed by the user terminal 10. When authentication is successful, the user terminal 10 transmits the fingerprint information to the onboard terminal 20. The onboard terminal 20 stores the received fingerprint information in the storage unit 22 or the like. Then, as described above, authentication for starting use is performed by the vehicle cloud server 30 and the service cloud server 40.

Thereafter, while the user is using the shared vehicle V, the onboard terminal 20 periodically performs biometric authentication by utilizing the steering or the like of the shared vehicle V. For example, a sensor provided on the steering of the shared vehicle V detects the fingerprint information of the user. The onboard terminal 20 verifies the fingerprint information obtained from the user terminal 10 at the time of starting the use with the biometric information obtained from the sensor during use of the shared vehicle V. If those biometric information coincides, the identity of the user who made the authentication the time of starting the use and the user who is actually using the shared vehicle V is guaranteed. Therefore, the onboard terminal 20 notifies the vehicle cloud server 30 that the user who has made the authentication at the time of starting the use and the user who is using the shared vehicle V are matched. Also, the vehicle cloud server 30 also notifies the service cloud server 40 that a legitimate user is using the shared vehicle V. In this way, spoofing can be detected. In the above example, the fingerprint information is used as the biometric information. However, other biometric information may be used, or a face authentication or the like may be used.

Figure 14:
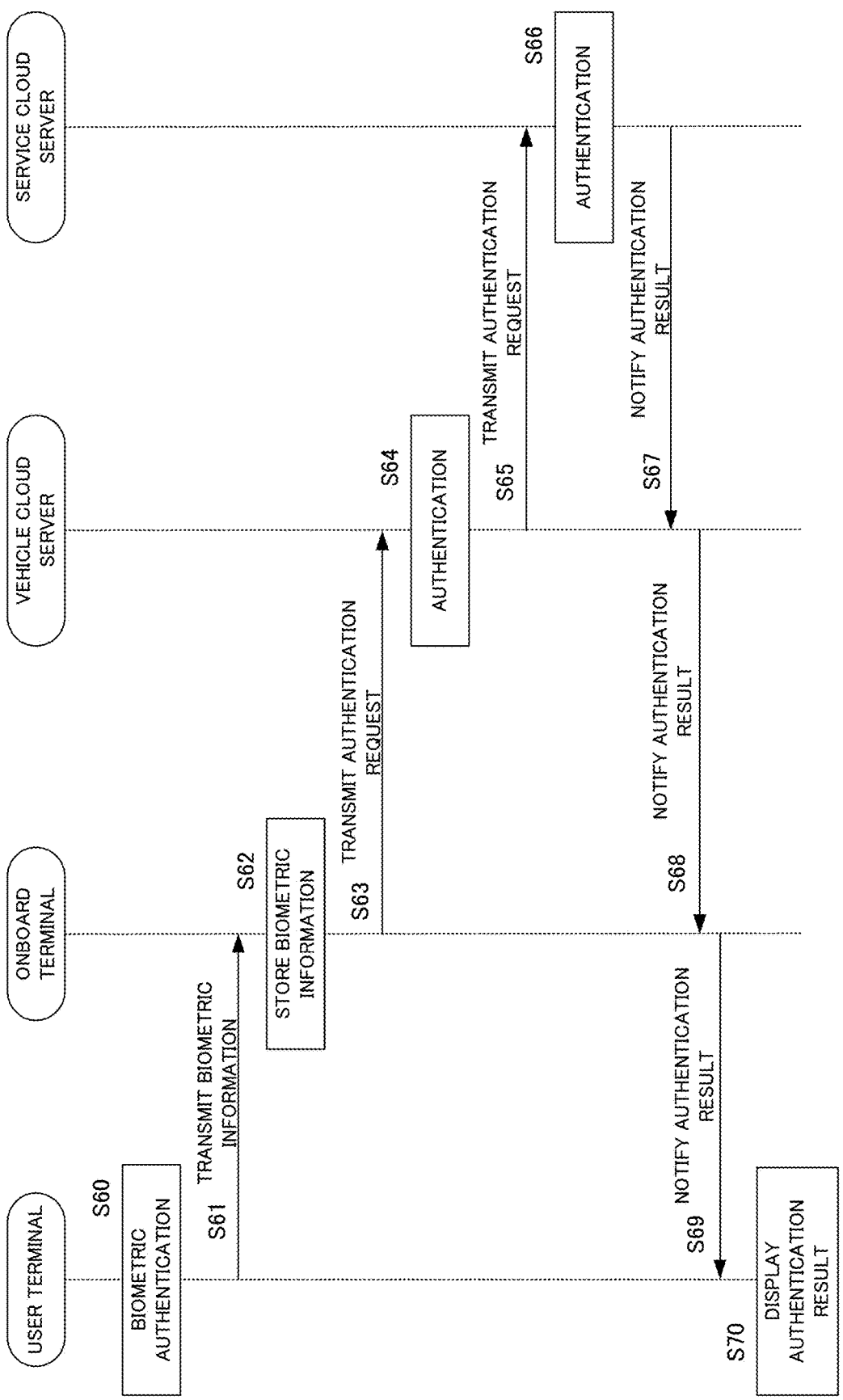
FIG. 14 is a flowchart illustrating authentication processing at the time of starting the use using the biometric information.

FIG. 14 is a flowchart illustrating authenticating process at the time of starting the use using biometric information. The user performs biometric authentication such as fingerprint authentication using the user terminal 10 (step S60). When the authentication is successful, the user terminal 10 transmits the biometric information to the onboard terminal 20 (step S61). The onboard terminal 20 stores the biometric information transmitted from the user terminal 10 (step S62), and transmits an authentication request to the vehicle cloud server 30 (step S63). At this time, as described above, the onboard terminal 20 transmits the shared vehicle user ID and the service cloud user ID to the vehicle cloud server 30.

The vehicle cloud server 30 performs authentication based on the shared vehicle user ID (step S64). When the authentication is successful, the vehicle cloud server 30 transmits an authentication request including the service cloud user ID to the service cloud server 40 (step S65). The service cloud server 40 performs authentication based on the service cloud user ID (step S66), and transmits the authentication result to the vehicle cloud server 30 (step S67).

The vehicle cloud server 30 transmits the authentication result received from the service cloud server 40 to the onboard terminal 20 (step S68), and the onboard terminal 20 transmits the authentication result received from the vehicle cloud server 30 to the user terminal 10 (step S69). The user terminal 10 displays the received authentication result on the display unit 14 (step S70). In this way, the authentication process at the time of starting the use is completed.

FIG. 15 is a flowchart of the authentication processing during the use of the shared vehicle V by the user. The onboard terminal 20 periodically detects the biometric information of the user by a sensor or the like (step S71), and verifies it with the biometric information acquired from the user terminal 10 at the time of starting the use. Then, the onboard terminal 20 transmits the verification result to the vehicle cloud server 30 (step S73). The vehicle cloud server 30 transmits the received verification result to the service cloud server 40 (step S74). Thus, when the biometric information matches in step S72, the vehicle cloud server 30 and the service cloud server 40 are notified that a valid user is using the shared vehicle V. On the other hand, when the biometric information does not match in step S72, the verification result indicating that fact is transmitted to the vehicle cloud server 30 and the service cloud server 40, so that the vehicle cloud and the service cloud can appropriately respond.

BRIEF DESCRIPTION OF REFERENCE NUMBERS

10 User terminal
20 Onboard terminals
27 Sensor unit
30 Vehicle cloud server
40 Service cloud server

The invention claimed is:

1. A terminal device used by a user of a vehicle, comprising:
a first input unit configured to receive a first user ID inputted by the user;
a first transmission unit configured to transmit the first user ID to a second server device operated by a service providing company;
a receiving unit configured to receive service information from the second server device, the service information including provision information, the provision information indicating information to be provided from a first server device to the second server device from among information transmitted from a terminal device of the vehicle to the first server device;
a storage unit configured to store the received service information;
a second input unit configured to receive a use start instruction of the vehicle inputted by the user; and
a second transmission unit configured to transmit from the terminal device of the vehicle to the first server device, only a part of the service information related to transmission destination of the first server device among the service information, when receiving the use start instruction,
wherein the provision information is information that the service providing company request in order to provide a service associated with the vehicle.

2. The terminal device according to claim 1, wherein the vehicle is jointly used by a plurality of users.

3. The terminal device according to claim 1,
wherein the first server device is a server device of an information collection company which collects information from the vehicle provided to the user, and
wherein the second server device is a server device of a service providing company which provides the service associated with the vehicle.

4. The terminal device according to claim 1, wherein the service information comprises:
the first user ID which is a user ID for a service providing company that provides the user with the service associated with the vehicle; and
a second user ID which is a user ID for a vehicle providing company that provides the user with a vehicle.

5. The terminal device according to claim 4, further comprising:
a third input unit configured to receive inputs of the first user ID and the second user ID by the user; and
a provision information acquisition unit configured to transmit the first user ID to the second server device, and receives the provision information corresponding to the first user ID from the second server device.

6. The terminal device according to claim 1,
wherein the service relates to insurance, and
wherein the provision information relates to an accident of the vehicle.

7. The terminal device according to claim 1,
wherein there are a plurality of first server devices, and
wherein the provision information is prepared for each of the plurality of first server devices.

8. An information communication method executed by a terminal device used by a user of a vehicle, the information communication comprising:
receiving a first user ID inputted by the user;
transmitting the first user ID to a second server device operated by a service providing company;
receiving service information from the second server device, the service information including provision information, the provision information indicating information to be provided from a first server device to the second server device from among information transmitted from a terminal device of the vehicle to the first server device;
storing the received service information;
receiving a use start instruction of the vehicle inputted by the user; and
transmitting, from the terminal device of the vehicle to the first server device, only a part of the service information related to transmission destination of the first server device among the service information, when receiving the use start instruction,
wherein the provision information is information that the service providing company request in order to provide a service associated with the vehicle.

9. A non-transitory computer-readable program executed by a computer provided in a terminal device used by a user of a vehicle, the program causing the computer to execute:
receiving a first user ID inputted by the user;
transmitting the first user ID to a second server device operated by a service providing company;
receiving service information from the second server device, the service information including provision information, the provision information indicating information to be provided from a first server device to the second server device from among information transmitted from a terminal device of the vehicle to the first server device;
storing the received service information;
receiving a use start instruction of the vehicle inputted by the user; and
transmitting, from the terminal device of the vehicle to the first server device, only a part of the service information related to transmission destination of the first server device among the service information, when receiving the use start instruction, wherein the provision information is information that the service providing company request in order to provide a service associated with the vehicle.

\* \* \* \* \*